N. P. PARK.
FRAMING DEVICE.
APPLICATION FILED FEB. 25, 1909.
967,045.
Patented Aug. 9, 1910.
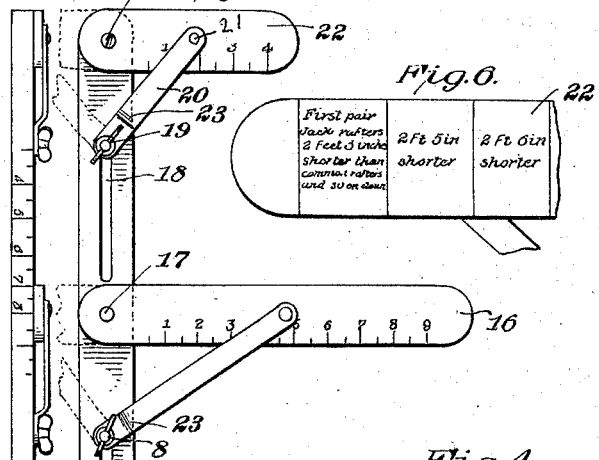
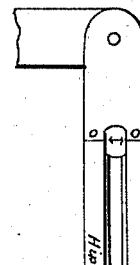
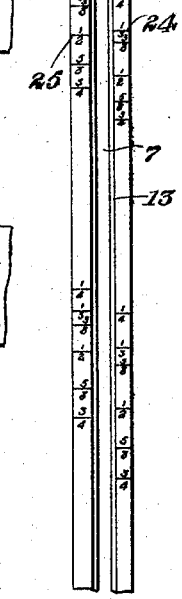
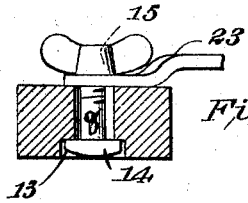
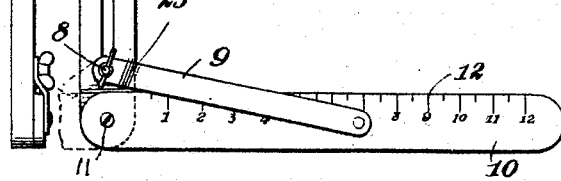
Witnesses
Inventor
N. P. Park,
By
Attorneys

UNITED STATES PATENT OFFICE.

NEY P. PARK, OF MONTGOMERY, ALABAMA, ASSIGNOR OF ONE-HALF TO CHARLES B. TEASLEY, OF MONTGOMERY, ALABAMA.

FRAMING DEVICE.

967,045. Specification of Letters Patent. Patented Aug. 9, 1910.

Application filed February 25, 1909. Serial No. 479,954.

*To all whom it may concern:*

Be it known that I, NEY P. PARK, citizen of the United States, residing at Montgomery, in the county of Montgomery and State of Alabama, have invented certain new and useful Improvements in Framing Devices, of which the following is a specification.

This invention relates to gages or framers of that general class especially designed for use by carpenters, builders and other persons, for ascertaining the proper bevel or inclination of rafters, and for facilitating correct measurement of other timbers used in the construction of buildings.

The object of the invention is to provide a comparatively simple and inexpensive tool of the class described, by means of which the proper cut and length of rafters for any desired span and pitch of roof may be conveniently and accurately determined.

A further object is to provide a gage or framer including a graduated body portion having a plurality of marking blades pivotally mounted thereon and adjustable at different angles or inclinations with respect to said body portion.

A still further object is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, and to acquire a knowledge of the details of construction, reference is to be had to the following description and accompanying drawing, in which:

Figure 1 is a side elevation of a gage or framing device constructed in accordance with my invention, showing the marking blades arranged at right angles to the longitudinal plane of the body portion; Fig. 2 is an edge view of the same; Fig. 3 is a side elevation, looking from the rear of the gage or framer; Fig. 4 is a plan view of the intermediate marking blade, showing the surface graduations; Fig. 5 is a similar view of the lower marking blade; Fig. 6 is a similar view of the upper marking blade; and, Fig. 7 is a transverse sectional view, showing the manner of clamping the connecting link in engagement with the body portion.

Corresponding and like parts are referred to in the following description and indicated in all the views of the drawing by the same reference characters.

The improved gage or framing device forming the subject matter of the present invention, includes an elongated body portion or rule 5 formed of wood, metal or other suitable material and having its opposite longitudinal edges graduated to indicate inches and fractions thereof, thus to provide a scale 6 on each side of said body portion. Formed in the member 5, is a longitudinally disposed slot 7 in which is slidably mounted a bolt or similar fastening device 8, the latter being connected through the medium of a link or lever 9, with a laterally adjustable blade 10. The blade 10 is pivotally mounted at 11 on one end of the body portion, and is provided on one side thereof with surface graduations 12, said blade being adjustable at any angle or inclination with respect to the adjacent longitudinal edge of the body portion 5, thereby to indicate the proper pitch or cut of a rafter. One face of the body portion 5, at the groove 7, is rabbeted at 13, to form a guide for the head 14 of the adjacent bolt 8, thus to prevent turning or twisting movement of said bolt when the latter is moved longitudinally of the member 5 to effect the adjustment of the blade 10, said blade being locked in adjusted position by means of a clamp nut 15 engaging the threaded end of the bolt and bearing against the adjacent end of the link 9, as best shown in Fig. 2 of the drawing. A similar blade 16 is pivotally mounted at 17 on an intermediate portion of the member 5, which blade is preferably of less length than the blade 10, and is also provided on one side thereof with surface graduations indicating inches and fractions thereof. A second slot 18 is formed in the body portion 5 in spaced relation to the slot 7, for the reception of a bolt 19 similar in construction to the bolt 8, and which receives the adjacent end of a link or lever 20 pivotally connected at 21 with a graduated blade 22 carried by the adjacent end of said body portion. Thus, it will be seen that the blades 10, 16 and 22 may be adjusted at any angle or inclination with respect to the longitudinal plane of the body portion, and locked in adjusted position by tightening the clamping members. It will also be noted that the connecting links or levers are each provided at one end thereof with an offset portion 23, so that the adjacent blades may be swung in the arc of a circle of 90 degrees, on either side of the body portion.

One side of the body portion is provided with a plurality of scales 24 and 25, one of which represents the pitch or cut of common rafters, while the other represents the pitch or cut of hip and valley rafters, similar scales or graduations being formed on the body portion adjacent each blade, as best shown in Fig. 3 of the drawings. The rear faces of the pivoted blades 10 and 16 are also provided with graduations corresponding to the graduations on the body portion, indicating the pitch or cut of a rafter, there being suitable graduations disposed beneath the pitch-indicating graduations, so that by adjusting the clamping nut to any one of the graduations on the scale 24, the proper cut of a rafter for any desired span and pitch of roof will be shown by the angle of the blade with respect to the body portion. The short blade 22 is provided with similar graduations for indicating the cross bevel of jack rafters to fit against the hip or valley rafters. Thus, it will be seen that by adjusting the blade 10, the proper bottom cut may be obtained, while by adjusting the intermediate blade 16, the correct top cut may be ascertained, the upper blade 22 serving to give the cross cut or bevel for jack rafters, as before stated. When you want to cut a rafter for a twenty-four foot span giving it three-eighths of an inch pitch, set the gage on all three of the blades to the graduations marked three-eighths on the common rafter side of the stock, and in which position the long blade gives the foot cut, the middle blade the top cut, and the short blade the side bevel for jack rafters. When the gage is set at zero, each blade will then be at a true right angle to the longitudinal edge of the stock or body portion. It will also be noted that when the several blades are swung laterally to a position at right angles to the longitudinal plane of the body portion, the tool may be used as an ordinary square, three of said squares being produced on either side of the body portion, by such adjustment.

Attention is here called to the fact that when the blades are swung laterally to inoperative position, the free ends thereof will be housed beneath the offset portion 23 of the connecting links or levers, so that said blades will be in alinement with the body portion, thereby taking up very little room and permitting several of said tools to be compactly assembled for transportation or shipment. By making the blades of different lengths, the same may be swung laterally upon and in longitudinal alinement with the body portion so as to permit the tools to be compactly folded for transportation or shipment.

Having thus described the invention, what is claimed as new is:—

1. A device of the class described, including a body portion having a longitudinal slot formed therein, spaced blades pivotally mounted on one side of said body portion, bolts slidably mounted in the slot of said body portion, links forming a pivotal connection between each blade and the adjacent bolt to permit lateral movement of the blade on either side of said body portion, and clamping nuts engaging the adjacent links for locking the blades in different positions of angular adjustment with respect to said body portion, said blades being movable laterally to folded position upon and in longitudinal alinement with said body portion.

2. A device of the class described, including an elongated body portion having spaced longitudinal slots formed therein of different lengths, terminal and intermediate blades of different lengths pivotally mounted on the same side of the body portion and movable laterally to folded position upon and in longitudinal alinement with said body portion, bolts slidably mounted in the slots, links forming a pivotal connection between each blade and the adjacent bolt, one end of each link being offset to permit lateral movement of the adjacent blade on either side of the body portion, and clamping nuts engaging the threaded ends of the bolts for locking the blades in different positions of adjustment, one side of the body portion at said slot being rabbeted to form a guiding groove for the reception of the heads of the clamping nuts.

In testimony whereof I affix my signature in presence of two witnesses.

NEY P. PARK. [L. S.]

Witnesses:
C. G. ZIRKLE,
J. H. BAXTER.